J. H. Dialogue,
Steam Cut-Off.

Nº 31,010. Patented Jan. 1, 1861.

Witnesses.
Henry Howson
Chas. Howson

Inventor.
John H. Dialogue.

AM. PHOTO-LITHO. CO. N.Y. (OSBORNE'S PROCESS.)

UNITED STATES PATENT OFFICE.

JOHN H. DIALOGUE, OF CAMDEN, NEW JERSEY.

VALVE-MOTION FOR STEAM-ENGINES.

Specification of Letters Patent No. 31,010, dated January 1, 1861.

*To all whom it may concern:*

Be it known that I, JOHN H. DIALOGUE, of Camden, Camden county, State of New Jersey, have invented a new and Improved Valve-Motion; and I do hereby declare the following to be a full, clear, and exact description of the same, reference being had to the accompanying drawing, and to the characters of reference marked thereon.

My invention consists of a reciprocating bar having slides connected to the steam valves of an engine by any suitable devices and certain catch levers having their upper surfaces parallel with the line in which the said reciprocating bar moves, in combination with two vibrating cams or their equivalents controlled by the governor, the whole being arranged for joint action substantially in the manner described hereafter, and forming a valve motion capable of cutting off the steam at any portion of the stroke.

In order to enable others skilled in the art to make and use my invention I will now proceed to describe its construction and operation.

Figure 1:
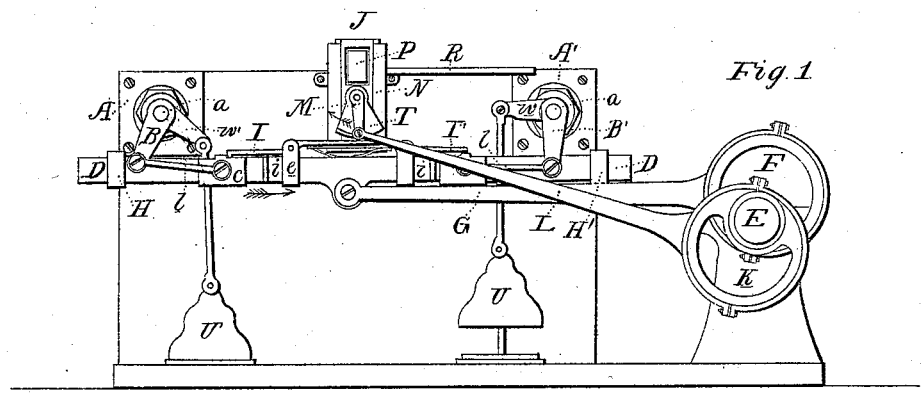
Figure 2:
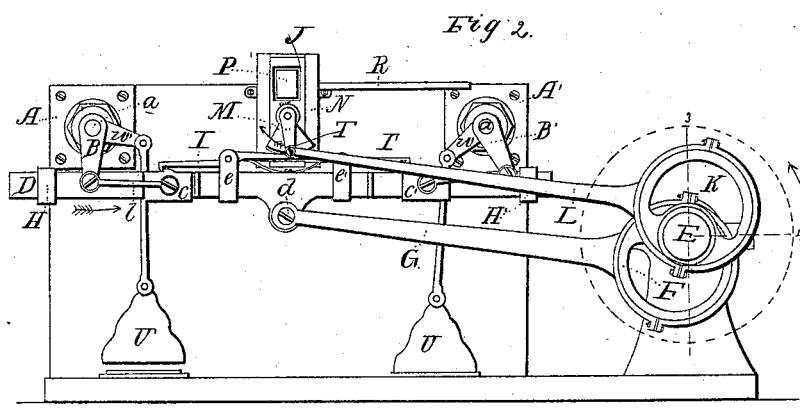
Figure 4:
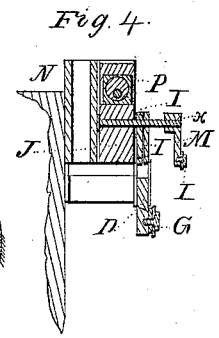
Figure 3:
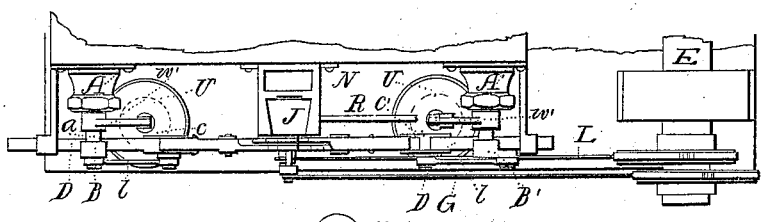
Figure 5:
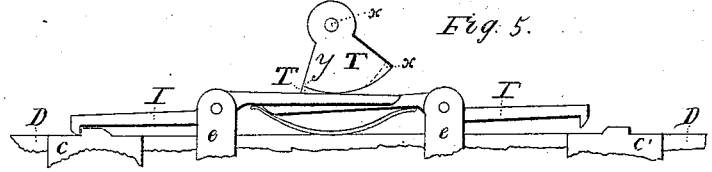

On reference to the accompanying drawing which forms a part of this specification, Figures 1 and 2 are side views of my improved cut off motion; Fig. 3, a plan view; Fig. 4, a transverse section on the line 1—2 Fig. 2; Fig. 5, a detached view of part of the valve motion drawn to an enlarged scale.

Similar characters refer to similar parts throughout the several views.

A and A' represent the two steam chest covers secured, one to one end and the other to the opposite end of the cylinder of a horizontal steam engine which is furnished with the ordinary cylindrical valves the spindles $a$, of the latter passing through stuffing boxes in the covers as usual. The spindle $a$, of the rear valve has an arm B, connected by a rod $b$, to the slide C, and the spindle $a'$, of the front valve has a similar arm B', attached by a rod $b$, to a similar slide C'. These slides are fitted snugly to, but so as to move freely on the bar D, which slides in guides H, and H', secured to the cylinder or steam chest or any convenient stationary part of the engine, a reciprocating motion being imparted to the bar D, by an eccentric F, on the crank shaft E, through the medium of the rod G, the end of which is jointed to the bar D, at a point $d$, midway or thereabouts between the two valves. On the bar D, is a projection $e$, arranged to carry a lever I, the outer arm of which is furnished with a lip for catching onto a projection on the slide C, and on the same bar D, is a similar projection $e'$, arranged to carry a lever I', which is also furnished with a lip arranged to catch onto a projection on the slide C'. Springs attached to the bar D, press against the under sides of both these levers and tend to maintain their outer arms depressed the upper surfaces of the inner arms being parallel with the line in which the bar reciprocates at all times excepting when depressed in the manner described hereafter.

In a vertical line drawn midway between the fulcra of the two levers I, and I', is the center of the spindle X, (Figs. 4 and 5,) which moves in a block J, and to which a vibrating motion is imparted by an eccentric K, on the crank shaft E, through the medium of the rod L, and arm M, the latter being secured to the spindle. This block J, is of the dovetailed form represented in Fig. 3, and is arranged to slide vertically in a dovetailed recess in a bracket K, secured to the cylinder or steam chest.

In the block J is a transverse opening for receiving a block P (Fig. 4) in which is an eccentric Q attached to the rod R which turns in the bracket N and which is connected by any suitable system of rods and levers to the governor of the steam engine so that when any variation in the position of the balls of the governor, consequent upon the variation in the speed of the engine, takes place the rod R and its eccentric Q will turn in one direction or the other and therefore raise or lower the dovetailed block J.

To the spindle X are secured two eccentrics or cams T and T', best observed on reference to Fig. 5, the edge of the cam T being so situated as to coincide with the upper edge of the inner arm of the lever I and the edge of the cam T' with the upper edge of the inner arm of the lever I'. Both these cams are of precisely the same form the point $x$ of the cam T which operates on the lever I being farther from the center of the cam's vibration than the opposite point $y$ and the cam T' which operates on the lever I' being so situated that its points $x$ and $y$ are exactly the reverse of those of the cam T.

Operation: Supposing the crank shaft to be revolving in the direction of the arrow (Fig. 2) and the crank pin to be at the point (1) or at half stroke the rod D consequently moving in the direction of its arrow, and the cams T and T' vibrating in the direction of their arrows. When the several parts are in the position specified, the arm B' has been released from all connection with the bar D and the weight $v$ connected to the arm $w$ has turned the spindle $a'$ of the front valve so that the latter has covered the steam port at the front end of the cylinder. In the mean time the lip at the end of the outer arm of the lever I having caught the projection on the slide $c$ and the latter having consequently been moved simultaneously with the bar D by the eccentric F to the position illustrated, the arm B with its spindle $a$ has also been moved thereby turning the rear valve and exposing the port at the rear end of the cylinder for the admission of steam, and this valve will remain open during the full movement of the bar D providing the lever I remains undisturbed and its lip continues to retain its hold of the projection on the slide C. As the crank however, continues to turn from the point (1) toward the point (2) in the direction of the arrow the cam T is moving in the direction of its arrow and that portion of the edge of this cam which projects farthest from the center of its vibration is gradually bearing on the edge of the inner arm of the lever I depressing the same and finally raising the lip of the outer arm free from contact with the projection on the slide C which is now disconnected from the bar free to be moved along the same by the action of the weight $v'$ which turns the valve spindle and causes the valve to close the port at the rear end of the cylinder thus cutting off the further admission of steam, all this having taken place before the crank pin has arrived at the point (2) when the piston is at the limit of its outward movement the completion of this movement after the closing of the valve being effected by the expansion of the steam admitted into the cylinder. In the mean time, and prior to the crank pin arriving at the point (2) the bar D has completed its forward movement in the direction of the arrow and the lip of the lever I' has caught the projection of the slide C', immediately after which, and before the piston begins to return, the bar D begins to move back in the direction contrary to that pointed out by the arrow, for it should be understood that the eccentric F is so secured to the shaft as to give the valves the proper lead. The slide C' being now as it were, a part of the bar D, moves back with the latter thereby commencing to open the front valve of the engine before the piston commences its backward movement or before the crank pin moves from the point (2) toward the point (3). During the latter movement the rod D continues its backward motion, the valve continues to turn and the cams T and T' to vibrate in a direction contrary to that pointed out by their arrow, the portion of the edge of the cam T' which projects farthest from the center of its vibration gradually bearing on the inner arm of the lever I' until its catch is raised from the projection of the slide C' which is now set at liberty thereby allowing the weight $v$ to close the valve which takes place after the piston has traversed the same distance in a backward direction as it had previously traversed in a forward direction prior to the release of the slide C and the consequent closing of the rear valve.

The above description has been given under the supposition that there has been no variation in the speed of the engine, consequently no variation in the position of the governor balls, and of course no variation in the position of the dovetailed block J, and in the vertical position of the cams T and T'. Should the speed of the engine be increased, the governor, acting on the rod R will turn the eccentric Q in the block P thereby depressing the block J and the cams T and T' the edges of the latter being consequently brought nearer to the upper edges of the inner arms of the levers I and I'. It will be evident that when this is the case the lips of these levers will be released from their respective slides sooner after the reversal of the bar D than when the cams occupied the more elevated position, and that the steam will be cut off at any point of the stroke of the piston determined by the altitude of the cams in respect to the levers I and I', and that the position of the cams is determined by the speed of the engine.

In some cases the speed of the engine may suddenly become so slow and the block J consequently as suddenly elevated to such a height that the cams will be free from contact with the levers, as seen in Fig. 1, where the bar D is moving in the direction of the arrow and the lever I' about to lay hold of the slide C'. After catching the slide the latter will be retained between the projection of the lever and the collar $i$ of the bar D in which position it will remain during the entire backward movement of the bars, on the completion of which the projection on the lever I will lay hold of the slide C which will also be retained between another collar $i$ on the bar D and the projection of the lever. In other words, when the cams are elevated above and free from contact with the levers the slides become for the time being a permanent part of the bar and moving with the latter will impart to the valves a uniform movement without any cutting off of the steam.

It will be observed that in order to obtain a uniformity and precision in the cutting off at different parts of the stroke of the engine decided upon by the governor it is essential that the upper surfaces of the outer arms of the levers I and I' should (when not depressed, as described above) be in a line parallel with the track in which the bar reciprocates. This I consider one of the most important and novel features of my invention.

The weights $v$ and $v'$ are arranged to coincide with plates so formed that on the descent of the said weight a body of air will be compressed between the weights and the plates thus forming as it were a cushion to ease the descent of the weights and prevent a disagreeable noise.

It will be evident that a vibrating motion may be imparted to the cams as well by any moving parts of the engine as by the eccentric K and that the eccentric rod G may be jointed to the bar D at a point other than that described. It will also be evident that although I have described my valve motion as applied to the movement of cylindrical valves it is equally applicable to the operation of slide, puppet, and other valves used in connection with steam engines.

I claim as my invention and desire to secure by Letters Patent—

The reciprocating bar D its slides C and C' connected to the steam valves by any suitable devices and the catch levers I and I' having their upper surfaces parallel with the line in which the said reciprocating bar moves in combination with the vibrating cams T and T' or their equivalents controlled by the governor, the whole being arranged for joint action substantially as and for the purpose herein set forth.

In testimony whereof I have signed my name to this specification, in the presence of two subscribing witnesses.

JOHN H. DIALOGUE.

Witnesses:
HENRY HOWSON,
CHARLES D. FREEMAN.